United States Patent [19]
Millett

[11] 3,810,218
[45] May 7, 1974

[54] CAMERA MECHANISM
[75] Inventor: James A. Millett, Fountain Valley, Calif.
[73] Assignee: Bank of Montreal, Los Angeles, Calif.
[22] Filed: Oct. 13, 1972
[21] Appl. No.: 297,324

[52] U.S. Cl.............. 354/204, 354/105, 354/142, 354/251
[51] Int. Cl.... G03b 15/04, G03b 9/44, G03b 17/24
[58] Field of Search........ 95/31 AC, 31 FL, 11.5 R, 95/58, 11 P, 1.1, 11 L

[56] References Cited
UNITED STATES PATENTS

| | | | |
|---|---|---|---|
| 2,827,839 | 3/1958 | Fuerst | 95/58 |
| 3,703,129 | 11/1972 | Goshima et al. | 95/11 |
| 2,907,253 | 10/1959 | McDonald | 95/1.1 |
| 2,395,828 | 3/1946 | Kallusch | 95/31 AC |
| 2,936,687 | 5/1960 | Bundschutt | 95/31 |
| 3,168,856 | 2/1965 | Norden | 95/1.1 |

Primary Examiner—Robert P. Greiner
Attorney, Agent, or Firm—Fryer, Tjensvold, Phillips & Lempio

[57] ABSTRACT

A small miniature camera employs as a primary operating mechanism a spring biased shutter bellcrank which is arranged so one of its arms or pawls operates a pivoted shutter blade and cooperates with the other pawl to control the film advance mechanism to prevent double exposures. Also, the disposition of the pawls is such that one of them may be employed to trigger impulse operated flash cubes in timed relationship with the shutter opened by the other pawl. To avoid complex indexing mechanisms within such a camera an optical indexing feature is provided which employs a separate light path to the edge of a film strip that is controlled by the shutter to mark the developed film strip with a reference mark for subsequent automatic film processing procedures.

18 Claims, 7 Drawing Figures

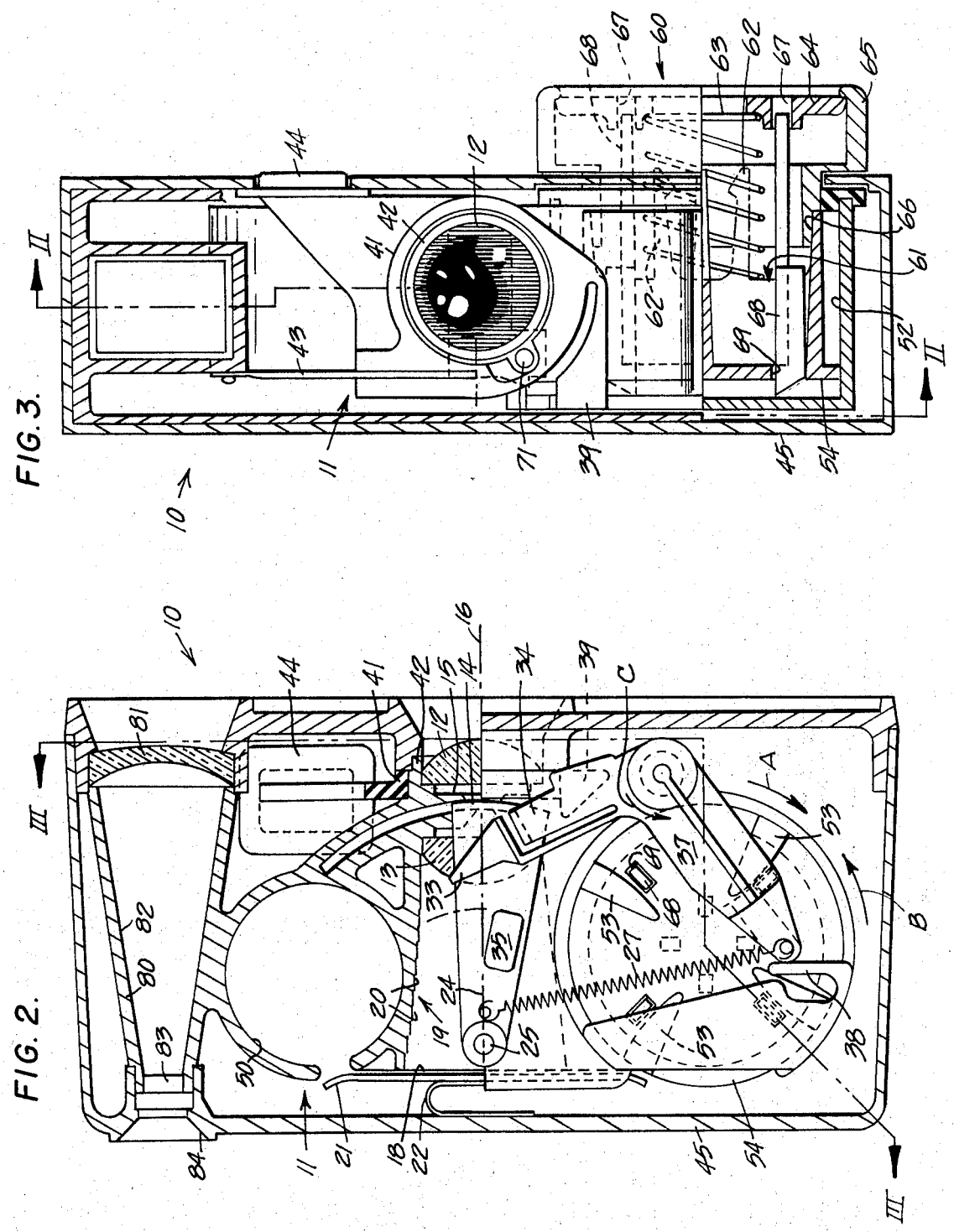

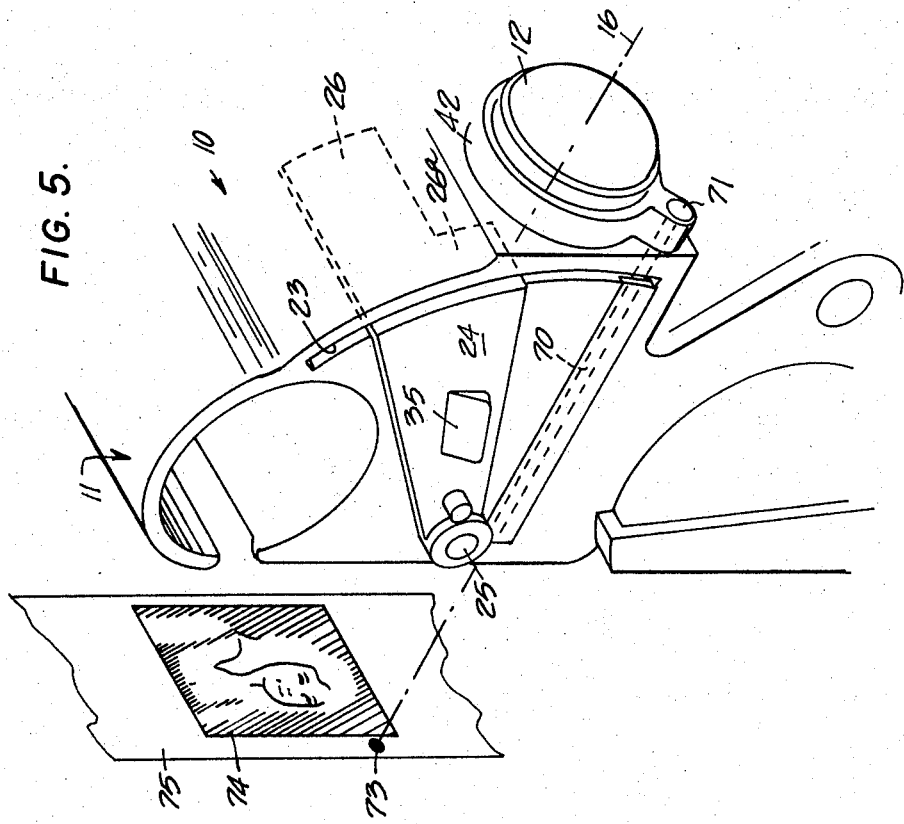
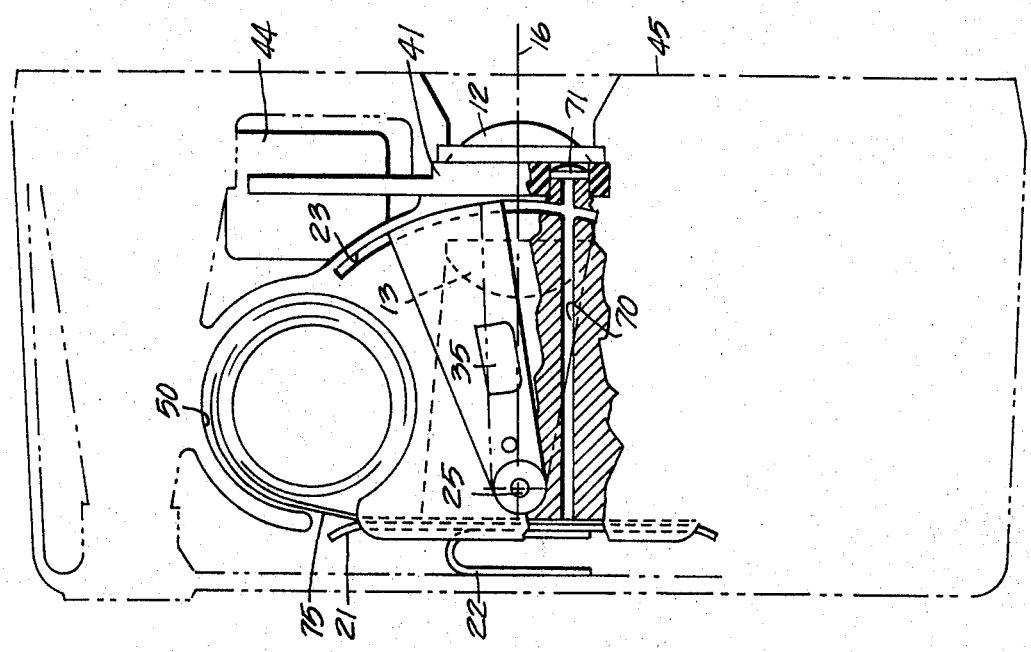

CAMERA MECHANISM

BACKGROUND OF THE INVENTION

Low cost cameras, often referred to as box cameras, have been well accepted by the public in the past. However, such cameras, usually are unable to utilize current technology with regard to film speeds and flash cubes, particularly the new impulse operated flash cubes sold under the trademark "Magicube," which do not require a battery to operate them. Also these low cost cameras do not typically incorporate common features found in the more expensive cameras, such as double exposure shutter interlocks, and single lever actuation for film transport and shutter cocking. Further they tend to be bulky and inconvenient to handle.

An object of the current invention is the provision of a small inexpensive camera which is convenient to carry and also incorporates many of the desirable features of the more expensive cameras.

Another object is the provision of a low cost miniature camera which can operate impulse fired flash cubes.

A further object is the provision of an optical indexing system for cameras which provides frame edge references alongside film negatives without complex gears, sprockets and the like in the camera, whereby a film strip exposed therein can be automatically processed.

SUMMARY OF THE INVENTION

The above objects and advantages can be accomplished with a camera mechanism which includes: a body member having a lens system operable to focus an image on a film framing window therein with an arcuate groove intersecting the optical axis of the lens system; a shutter arm pivoted on the body member with a shutter blade which is received in the arcuate groove and biased so the blade closes the optical axis; a spring driven shutter bellcrank with two pawls being pivoted in the body member and operable to momentarily displace the shutter bar when tripped to open the optical axis; and manually operated film transport means operable to advance a film strip and cock the shutter bellcrank through engagement with the pawls. The film transport may also include interlocks which cooperate with the pawls to prevent transport reversal and double exposures. Further the body member may include a separate light path to the edge of the framing window that is controlled by the shutter blade to provide an edge reference on a film strip for automatic processing of the developed film strip.

BRIEF DESCRIPTION OF THE DRAWINGS

FIG. 2 is a stepped side section along lines II—II of FIG. 3 of the camera mechanism supported within a suitable case;

FIG. 3 is a stepped front section along lines III—III of FIG. 2 to illustrate the related details of the components of the camera mechanism;

FIG. 4 is a broken away elevation illustrating the separate light path in the body for forming an edge reference on a film strip;

FIG. 5 is a broken away perspective with a developed portion of a film strip illustrating both the image negative and the edge reference formed thereon by utilizing the camera mechanism;

DESCRIPTION OF AN EMBODIMENT

Figure 1:
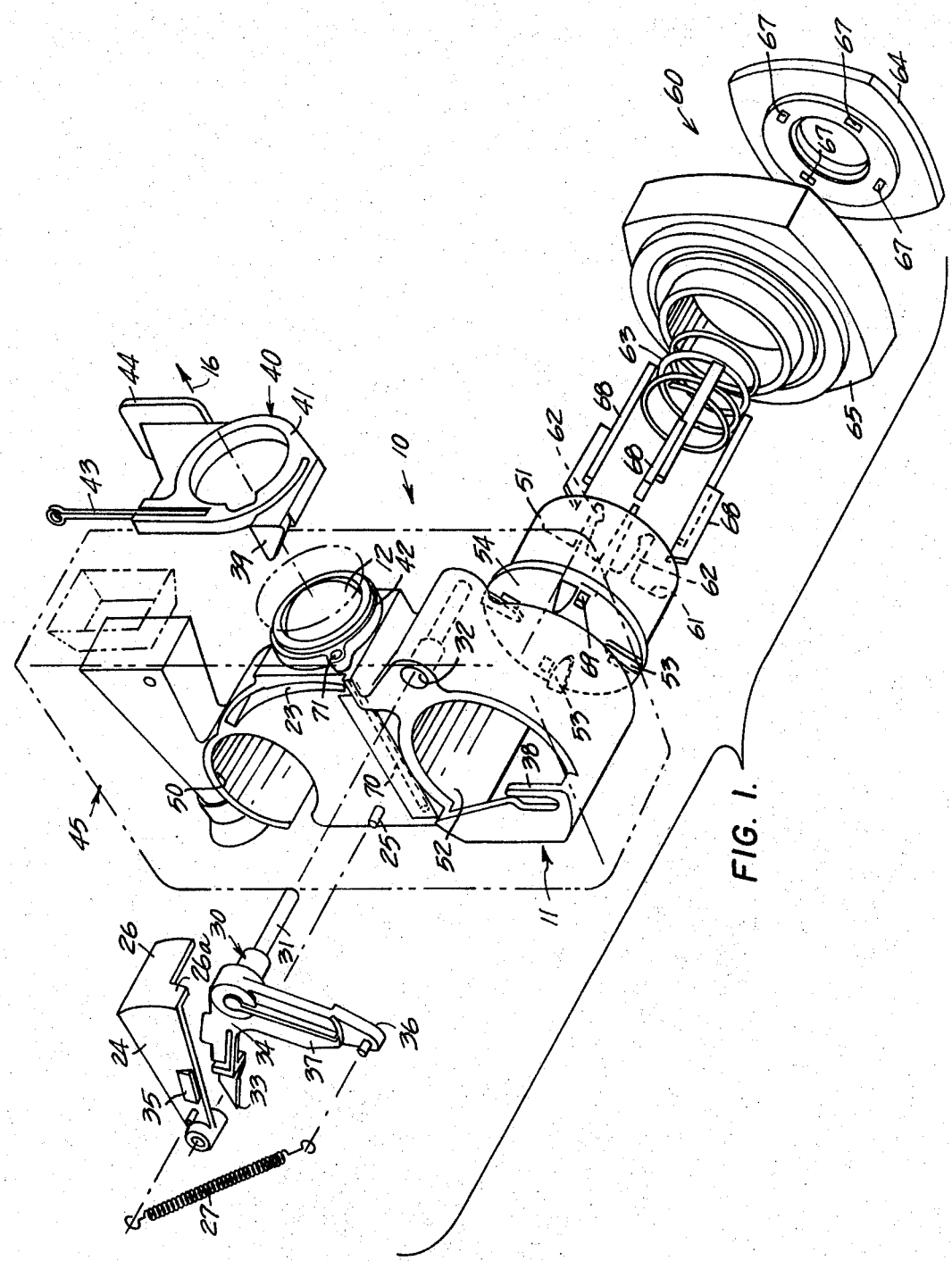
FIG. 1 is an exploded perspective of the camera mechanism illustrating its principal components and showing a shitable case therefore with broken lines.

In FIG. 1, most of the principal components of a camera 10 are separately illustrated in the exploded view. The main component, a body member 11 is formed as a unitary molded structure on which the other illustrated components are assembled. Generally this body member forms the light-tight camera box (best shown in FIG. 2) that includes a front objective lens 12, a rear objective lens 13 separated by a diaphragm 15 having a small aperture 14 therein aligned with the optical axis 16 of the resulting lens system.

With the lens system open an inverted image is focused in the plane of an exposure or framing window 18, along the back of the body member through a diverging light-tight rectangular tunnel 19 which extends from the rear lens 13 to the framing window, as can be seen in FIG. 2. The surface of the tunnel includes corrugations 20 in its surface which prevents spurious light from being reflected onto the film plane of the framing windows from the sides of the tunel. A flat backing plate 21 is urged against the framing window with the spring 22 to hold a portion of the film strip sandwiched between the edges of the framing window and the plate in a flat plane for an exposure of an image focused thereon by the lens system.

In order to use this lens system in a camera a shutter must be provided so that the optical axis thereof can be opened and closed. To accommodate a between-the-lens shutter an arcuate groove 23 is formed in the body member 11 which intersects the optical axis of the lens system just behind the diaphragm 15 as best can be seen in FIGS. 1 and 2. The groove extends from the intersection point between lenses 12 and 13, toward one end of the camera body member to allow for extended travel of a shutter blade disposed in the groove. The transit time of the blade in the groove controls the shutter speed.

A shutter is formed with a shutter bar 24 which is pivoted on pin 25 projecting from the side of the body member 11 and extends towards the front of the camera to the arcuate groove 23 where a curved shutter blade 26 is mounted normal to the end of the shutter bar and extends into the groove, as best illustrated in FIG. 5. A biasing spring 27 is connected to the shutter bar near its pivot and urges the bar to a position so that the curved shutter blade closes the optical axis of the lens system. If the shutter bar is momentarily displaced against the spring tension it will open the optical axis, allowing the lens system to focus an image on the exposure plane of the framing window 18.

To control the shutter blade 26, a multi-function shutter bellcrank 30 is employed and is pivoted beneath the arcuate groove 23 by inserting its integral pivot pin 31 into a stepped bore 32 formed in the body member 11. The center bellcrank includes two angularly disposed arms or pawls which are herein described, as shutter pawl 34 and drive pawl 37. The shutter bellcrank is mounted so that the shutter pawl slides over the top of the shutter bar but engages a raised ramp or cheek 35 formed on the surface of the shutter bar so that the stepped end 33 of this pawl will engage the cheek as the bellcrank pivots about its pivot pin in a direction causing the pawl to move against this cheek. Drive for the shutter pawl is provided by the spring 27 which is connected to the stepped end 36 of the drive pawl of the shutter bellcrank and also connected to the shutter bar, as previously described. Through this arrangement only a single spring is needed to provide the proper spring bias on these several moving parts.

As can be seen in FIG. 2, where the shutter bellcrank 30 is in a tripped condition the end 36 of the drive pawl 37 abuts against a resilient stop 38 formed on the body member and the end 33 of the shutter pawl is located above cheek 35 on the shutter bar. Thus if the shutter bellcrank is rotated counterclockwise from the position illustrated, a ramped surface of the cheek will lift the end of the shutter pawl as it slides over the cheeks and moves to a position on the other side of the cheek, to cock the camera. The shutter pawl can be bifurcated as illustrated to reduce the force necessary to deflect its end as it is lifted by the ramped surface. When the rotation proceeds to the point the bellcrank reaches a cocked position, a shutter catch 39, which is biased against the underside of the shutter pawl in the tripped condition, raises to prevent clockwise rotation of the bellcrank until this catch is manually released. The shutter catch 39 is controlled by a trip member 40 that has a large apertured ring 41 which is received on the projecting end of the lens barrel 42 at the front of the member. As a result, rotational movement of this ring will cause the catch to disengage the shutter pawl when the apertured ring structure is rotated on the lens barrel. A flat or wire spring 43 is connected tangentially to the apertured ring 41 and also to the body member to provide the biasing to urge the catch into engagement with the shutter pawl when it is in a cocked position. This trip structure is shown in plan in FIG. 3 and the catch thereof is engaged with the shutter pawl in the cocked condition shown in FIG. 6. A trip button 44, that is accessible through an opening in the outer camera case 45 can be depressed to release the shutter pawl as the apertured ring rotates against the spring tension of the flat or wire spring.

Figure 6:
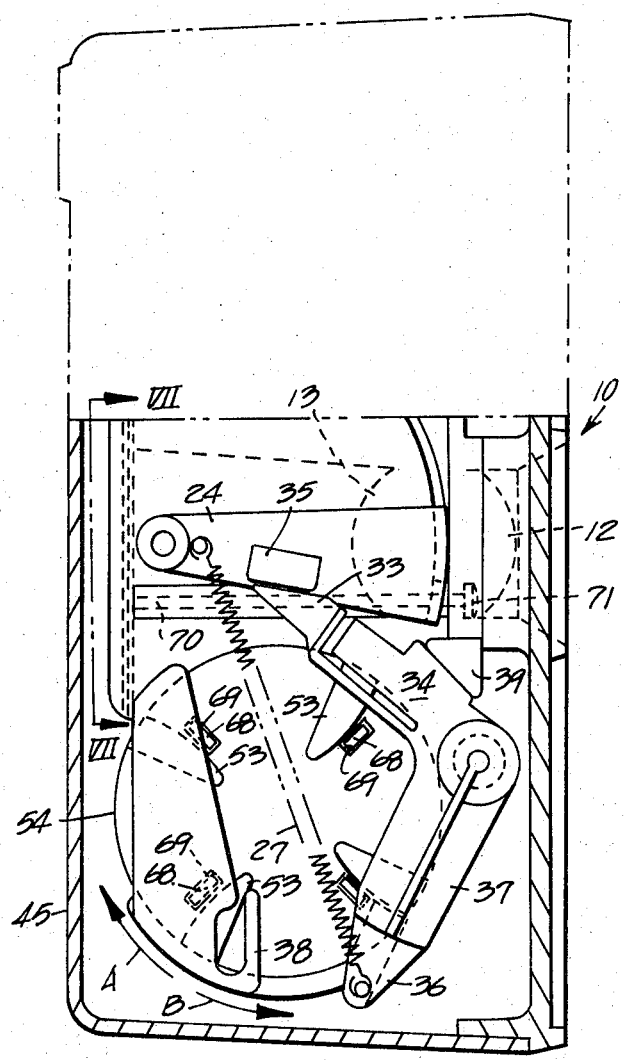
FIG. 6 is a side section of the lower half of the camera mechanism illustrated in FIG. 2 but with the shutter bellcrank in a cocked position versus the tripped position shown in FIG. 2.

Upon release of the shutter pawl by the catch the shutter bellcrank rotates clockwise from the position shown in FIG. 6, so that its end 33 momentarily engages a surface of cheek 35 on the shutter bar 24 and kicks the latter in a direction to drive the shutter blade out of alignment with the optical axis whereby the lens system of the camera is opened. After this engagement with the cheek the shutter pawl continues its arcuate path to a tripped position where the cheek will not contact its end 33 as spring 27 returns the shutter blade to interrupt the optical axis. This position, giving the required clearance, is obtained when the drive pawl 37 hits the resilient stop 38 as shown in FIG. 2. The impulse induced to the shutter arm, will cause the shutter blade to hit the top of the arcuate groove 23 and bounce back with the aid of spring 27 to close the optical axis as the end of the shutter pawl clears the cheek during this transit. The shutter blade is a ballistic member but has its maximum speeds at the time the shutter blade opens the optical axis and closes it. Therefore an image shift on the film due to changes of the speed of the shutter blade in closing or opening the optical axis does not occur. In order to change the speed of the shutter a stop can be placed in the arcuate groove 23 to limit the travel (transit time) of the shutter blade and thereby increase the speed of the shutter since its transit period will be reduced depending on where the stop is located in the arcuate groove. However, the shutter blade cannot be stopped until after the end 33 of the shutter crank has cleared the cheek, as described above, since otherwise the shutter would hang-up on the shutter pawl.

As it is an object of this camera to provide a system in which double exposure of negatives is prevented, the shutter bellcrank 30 is arranged to be rotated from a tripped position to a cocked position as a film strip is wound from a film storage well 50 in the body member onto a take-up film drum 51 adapted to be received in the film take-up well 52 also formed in the body member. By manually turning the film take-up drum a portion of the film strip will sequentially be pulled from the storage well, across the framing window 18 and onto the outer surface of the drum. By controlling the cocking of the shutter bellcrank with the film take-up drum a double exposure of the film strip in the framing window can be avoided. This feature is possible by the cooperation of raised radial ribs 53 formed on the exterior surface of a control disc 54 which is affixed to the bottom of the film drum 51, so it rotates therewith. In the embodiment shown, the four ribs are equally spaced on the surface of the disc to form four equal quadrants and are further arranged to cooperate with the shutter pawl and the drive pawl of the bellcrank 30, as the disc rotates, to control film advance. Referring to FIG. 2, the shutter bellcrank is in the tripped position so that the end of the drive pawl 37 abuts on the stop 38. As the end 36 of the drive pawl is stepped inwardly towards the drive disc when the film drum is in its proper position, it can be seen that one of the ribs 53 lies directly under the drive pawl so that it is contiguous to the inner stepped wall of the end of this pawl. As a result, if the film drum is turned in the direction of arrow A this rib will engage the stepped wall and prevent rotation of the film drum in this direction. Thus the film strip cannot be damaged by inadvertent reversal of the film drum. However, if the film drum is manually turned in the direction of arrow B a rib on the disc adjacent to the outer end of the drive pawl will engage this end and rotate the bellcrank counterclockwise as this rib is advanced against the pawl. A counterclockwise rotation of the shutter bellcrank is effected, indicated by arrow C, and continues until the rib forces the stepped end 36 of the drive pawl outboard of its outer end which allows the rib to slide under the raised central portion of the drive pawl. At this point of rotation of the disc it can be seen that the stepped end 33 of the shutter pawl has moved so its inner stepped wall will engage the forward rib of this quadrant stopping further rotation of the disc. As this point of rotation of the film take-up drum has been reached, catch 39 will have been disengaged from under the shutter pawl and will have raised to be in line with this pawl. Thus as the rib which is driving the shutter bellcrank slides under its stepped end, the spring 27 will pull the bellcrank slightly in a clockwise direction so the shutter pawl engages the catch and so that the wall of the stepped end 36 moves behind its contiguous rib thereby locking the disc from being rotated in either direction until after the bellcrank is tripped. The cocked position of the bellcrank is illustrated in FIG. 6 wherein the abovedescribed inner lock of the ribs is best shown.

Another function of bellcrank 30 is the provision of the force and the timing of the firing of impulse operated flash cubes that are mounted in the film transport knob of the camera. Through the control of the film winding interval a proper flash cube registration with the front of the camera is obtained. More particularly the small camera mechanism is designed to utilize miniature four-sided flash cubes sold under the trademark "Magicube" that includes a small striker that is released by a short mechanical impulse to fire a flash cube having a mercury fulminate primer. As a result, batteries are not required for flash operation.

More particularly the hollow interior of the film drum 51 includes a bayonet-type socket 60 for receiving such a flash cube (not shown). In general this socket includes a base 61 having four projecting prongs 62 which are received in indexing slots in the tubular base of such a flash cube, as it is pushed into the socket, and ultimately engage a series of notches on this tubular base to locate it at the proper axial position within the socket. A spring 63 which is supported on the pronged base holds a socket cover 64 against the inner lip of the manual winding knob 65, that includes a flange 66 which is received and sealed in the top of the film drum to complete the socket, which is best illustrated in FIG. 3.

The socket cover 64 includes a central opening for the tubular base of the flash cube and four circumferentially spaced apertures 67, each of which forms a guide for one end of an impulse pin 68, which has its opposite end received in a separate aperture 69 in the control disc 54, previously described. Thus when an impulse operated flash cube is inserted into the socket and pushed inwardly depressing the cover, the impulse pins will be received in the apertures in the cube for operating the striker mechanisms therein. These impulse pins are accurately positioned relative to the striker mechanisms within the flash cube by the pronged socket which controls the depth of insertion of the tubular base of the flash cube and also by the proper selection of the length of the individual pins.

As can be seen in FIG. 3, the end of each impulse pin 68 extends slightly above the exterior surface of the control disc 54, includes a ramped surface and is closely adjacent to one of the ribs 53 thereon. Referring to FIG. 6, showing the bellcrank 30 in its cocked position, it can be appreciated when the bellcrank rotates clockwise, as catch 39 is released, that the stepped end 36 of the drive pawl 37 will ride across the ramp of the projecting end of the adjacent impulse pin, driving it into the film drum and thus into the base of the inserted flash cube. As a result, a striker within the cube will be lifted off its catch and fire the flash cube. Further, as the drive pawl engages the impulse pin it can be seen that the shutter bar 24 has already been displaced by the shutter pawl so that shutter blade 26 has opened the optical axis at the impulse pin is actuated. Thus, the relative angular positioning of the two pawls of the shutter bellcrank, ensure a proper timed relationship between the shutter and the firing of the flash cube. Further, it should be noted that only one of the impulse pins is operated for each 90° rotational position of the control disc. The flash cube is properly oriented in the socket by axial grooves on its tubular base, and since the socket will turn one-quarter turn after each flash, the next side of the cube will be in position to fire when the film is advanced. Therefore, for each flash picture, proper side of the flash cube is always in registry with the front of the camera.

Figure 7:
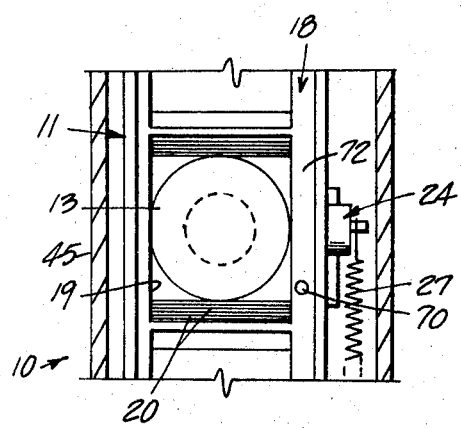
FIG. 7 is a rear section through the camera mechanism illustrating the framing window and the aperture in one edge thereof for optically indexing a film strip.

Another feature of the instant invention is related to a provision for indexing the edge of the film strip so that the individual negative can be automatically located after the film strip is developed. This is important in small cameras since the cost of indexing the film strip for subsequent processing is expensive and complicates the design of a camera. The particular indexing of this invention is a form of optical marking or notching. It is accomplished by the utilization of a separate light path to one edge of the film strip which is parallel to the optical axis of the lens system, but completely independent therefrom. In the instant embodiment a passage 70 is formed in the body member 11, along the shutter bar side of the lens system to form this separate light path. This passage extends from the front of the camera and opens on an edge 72 of the framing window 18 against which the film strip is pressed by the flat plate 21 holding it against the framing window. FIGS. 4, 5 and 7 illustrate portions of this structure and it can be seen that passage 70 also intersects the arcuate groove 23 and includes a simple lens 71 at the front of the camera to collect additional light for the optical indexing or notching function. As it is necessary to achieve a definite relationship between the exposed negative on the film and the optical notch formed by this passage, the shutter blade 26 includes a secondary blade 26a which controls the opening and closing of the passage 70 simultaneously with the opening and closing of the optical axis 16 of the lens system. As a result, a small exposed dot is formed alongside the negative in a predetermined location (see FIG. 5). After the film is developed an optical scanner can locate the dot 73 and properly position the negative 74 during printing. Also it should be appreciated that a developed film strip 75 is illustrated in FIG. 5, so that the dot formed along the edge of the negative will be shown in relationship to the optical indexing system from which it was produced.

Since the film strip advance distance on a film take-up drum changes due to an increasing effective diameter, as turns of the film strip accumulate thereon, the film advance distance is not constant even though the angular increment of the drum is constant when the drum is advanced. Thus, with the optical pattern exposed on the edge of the film strip beside each negative, it can be used to accurately position each negative in a film processor for printing. This eliminates the need for sprockets and gearing in the camera to provide constant spacing between negatives exposed as the patterns exposed on the edge provide reliable positioning even though the distance between the exposed negatives is not constant.

A view finder 80 may be incorporated in the body member 11 and is illustrated in the drawings. It includes an objective lens 81 and an optical tunnel 82 that opens into an aperture in the camera case and a secondary lens 83 located at the rear of the optical tunnel adjacent to the eye piece 84 of the camera case. The optical axis of the view finder is parallel to the optical axis of the lens system, as can be seen and the view

What is claimed is:

1. A camera mechanism comprising:
   a camera body member having a lens system for focusing an image in a film framing window therein and an arcuate groove intersecting the lens system
   a biased shutter bar having one end pivoted on said body member and a curved shutter blade at the opposite end, said shutter blade received in said arcuate groove and operable to open and close said lens system with its bias urging said shutter bar to close said lens system;
   a spring biased shutter bellcrank pivoted on said body member adjacent to said shutter bar, said bellcrank having two angularly disposed pawls, one of said pawls operable to momentarily engage said shutter bar when said bellcrank is released from a cocked position and is driven by its spring bias to temporarily open said lens axis; and
   film transport means associated with said pawls and operable to rotate said bellcrank against its spring bias when said film is advanced by said transport means to simultaneously move said bellcrank to a cocked position as the film is advanced.

2. The camera mechanism defined in claim 1 wherein a releasable catch is provided in said body member which is operable to engage and disengage the bellcrank whereby said bellcrank can be respectively held in a cocked position and released through manual operation of said catch.

3. The camera mechanism defined in claim 2 wherein the lens system includes two separate lenses with an apertured diaphragm therebetween and wherein the actuated groove intersects the axis of said lens system between said diaphragm and one of said lenses.

4. The camera mechanism defined in claim 1 wherein the film transport means includes a film take-up drum with a rotatable control disc adjacent to the pawls of the bellcrank, said disc having raised ribs thereon which cooperate with stepped surfaces on the ends of said pawls to prevent reversal of said control disc and to control the film advance distance as well as to rotate said bellcrank against its spring bias to a cocked position.

5. The camera mechanism defined in claim 1 wherein a common spring having its ends respectively connected to the shutter bar and the bellcrank is operable to provide the bias for both.

6. The camera mechanism defined in claim 4 wherein the film drum included a winding knob connected thereto to turn it in a direction to advance the film a discrete interval corresponding to the film advance distance allowed by the pawls and control disc.

7. The camera mechanism defined in claim 6 wherein the winding knob includes a socket for an impulse operated flash cube and the film drum includes a plurality of impulse pins therein arranged so one of the pawls engages an end of one of said pins each time the bellcrank is released from a cocked position, whereby the engaged pin will be displaced sufficiently to fire a section of such a flash cube mounted in said socket.

8. The camera mechanism defined in claim 7 wherein the control disc includes four equally spaced raised ribs on its surface and the socket in the winding knob includes indexing means so the proper section of a four sided flash cube is always properly positioned to the front of the camera when the bellcrank is in a cocked position.

9. The camera mechanism defined in claim 1 wherein a separate passage is formed in the body member parallel to the lens system and apertured on an edge of the framing window and at the front of the camera and wherein the shutter blade includes an auxiliary shutter blade operable to intersect said passage, whereby said passage will be open and closed simultaneously with the lens system to expose an indexing mark on the edge of a portion of a film strip in said framing window.

10. The camera mechanism defined in claim 9 wherein the passage includes a lens at the front of the camera for concentrating the light on the edge of the portion of the film strip when it is opened by the auxiliary shutter.

11. A camera mechanism comprising:
    a camera body member having a lens system with an optical axis and film storage recesses on opposite sides of said optical axis and a film framing window in line with said optical axis, said body member having an arcuate slot therein passing through said optical axis;
    a shutter arm pivoted on said body member and having a shutter blade mounted normal to its end which shutter blade is received in said arcuate slot when said shutter arm is assembled on said body member and is operable to interrupt said optical axis in one position of its arcuate travel in said arcuate slot and open said optical axis when it moves out of said one position, said shutter arm biased to said one position;
    a shutter bellcrank pivoted on said body member adjacent to said shutter arm, said crank having a shutter pawl operable to temporarily engage said shutter arm during arcuate travel thereof to momentarily displace said shuteer blade from said one position;
    biasing means connected to said shutter bellcrank operable to drive its shutter pawl into engagement with said shutter bar;
    trip means arranged to engage said shutter bellcrank and operable to prevent said biasing means from driving its shutter pawl into engagement with said shutter arm until said trip means releases said shutter bellcrank; and
    cocking means associated with said shutter bellcrank and operable to move it against said biasing means whereby said trip means can re-engage said shutter bellcrank after releasing it as the cocking means rotates said bellcrank.

12. The camera mechanism defined in claim 11 wherein the biasing means connected to the shutter crank is also connected to said shutter arm to bias it to its one position closing the optical axis.

13. The camera mechanism defined in claim 11 wherein the cocking means includes a connected drive disc having raised spaced ribs on its surface, said drive disc being mounted contiguous to the shutter bellcrank so said ribs can alternately engage the shutter pawl and a drive pawl thereof whereby the direction of rotation of said disc is prevented in one direction of rotation by said ribs and their engagement with said pawls and so the rotation of said disc is limited to 90° of rotation in the opposite direction each time said shutter bellcrank is moved by said disc against its biasing means to be reengaged to the trip means thereby preventing double exposures in the camera mechanism.

14. The camera mechanism defined in claim 13 wherein the ribs are 90° apart and one rib engages the end of the drive pawl to move the shutter bellcrank against its biasing means until a rib diametrically located to said one rib engages the shutter pawl to prevent further rotation.

15. The camera mechanisms defined in claim 13 wherein the drive disc is connected to a film advance spool and operable to advance said spool a measured amount each time said disc is manually rotated within its 90° increments of rotation.

16. A camera mechanism as defined in claim 13 wherein said drive disc is operably connected to a flash mounting means and includes flash impulse pins positioned in apertures in said disc operable to be momentarily engaged to the drive pawl when the shutter bellcrank is released whereby an impulse operated flash in said flash mounting means will be fired with the optical axis open for a flash picture by a movement of one of said pins.

17. The camera mechanism defined in claim 11 wherein an optical indexing aperture is located in the body member parallel to said optical axis alongside the lens system so said aperture centrally intersects an edge of the framing window and the arcuate slot and wherein the shutter blade includes a secondary blade that simultaneously opens and closes said optical indexing aperture with said optical axis.

18. The camera mechanism defined in claim 17 wherein the optical indexing aperture includes a separate lens to enhance the light passing through said optical indexing aperture when it is open.

* * * * *

UNITED STATES PATENT OFFICE
CERTIFICATE OF CORRECTION

Patent No. 3,810,218           Dated  May 7, 1974

Inventor(s)  James A. Millett

It is certified that error appears in the above-identified patent and that said Letters Patent are hereby corrected as shown below:

In column 1, line 58, it is believed the expletive therein should be deleted and "suitable" substituted therefor.

Column 8, line 38,   , "shuteer" should be --shutter--.

Signed and sealed this 1st day of October 1974.

(SEAL)
Attest:

McCOY M. GIBSON JR.
Attesting Officer

C. MARSHALL DANN
Commissioner of Patents